United States Patent [19]
Wirt

[11] 3,831,710
[45] Aug. 27, 1974

[54] SOUND ABSORBING PANEL

[75] Inventor: Leslie S. Wirt, Newhall, Calif.

[73] Assignee: Lockheed Aircraft Corporation, Burbank, Calif.

[22] Filed: Jan. 24, 1973

[21] Appl. No.: 326,508

[52] U.S. Cl............... 181/33 G, 161/68, 181/33 H
[51] Int. Cl............................................. E04b 1/84
[58] Field of Search............ 181/33 G, 33 R, 48, 54, 181/59, 33 H, 33 HA, 33 HB; 161/68, 139

[56] References Cited
UNITED STATES PATENTS

| | | | |
|---|---|---|---|
| 2,887,173 | 5/1959 | Boschi | 181/33 G UX |
| 2,916,101 | 12/1959 | Naman | 181/48 UX |
| 3,177,970 | 4/1965 | Boschi | 181/33 G UX |
| 3,180,448 | 4/1965 | Gary et al. | 181/33 G UX |
| 3,353,626 | 11/1967 | Cremer et al. | 181/48 |
| 3,688,866 | 9/1972 | Kong | 181/33 K |

FOREIGN PATENTS OR APPLICATIONS

| | | | |
|---|---|---|---|
| 348,808 | 10/1960 | Switzerland | 181/33 G |
| 822,954 | 11/1959 | Great Britain | 181/33 G |
| 1,147,492 | 4/1969 | Great Britain | 181/33 G |

Primary Examiner—Richard B. Wilkinson
Assistant Examiner—John F. Gonzales
Attorney, Agent, or Firm—Billy G. Corber; Ralph M. Flygare

[57] ABSTRACT

A sound absorbing panel, generally comprising a honeycomb cellular layer, an impermeable backing enclosing one end of the cells, a permeable facing covering the other (open) end of the cells, and wherein adjacent cells are made to have a different resonant frequency. The adjacent, dissimilar, cells each have a predetermined difference in acoustic reactance and are acoustically in parallel. However, they do not act individually since their resonances combine in a useful way such that whichever cell is resonant dominates the acoustic behavior of the pair. The cell geometry is chosen such that one cell is at or near a resonance while the adjacent cell is at anti-resonance. The parallel system acts resonantly whenever either side is near resonance. As a result, sound absorption remains high over a broad range of frequencies. The functional operation of the panel is relatively independent of the materials from which it is made and may, for example, be fabricated entirely from metal. It is particularly suitable for sound attenuation in jet engines and other applications having adverse environmental conditions, requiring sound absorptive panels, baffles, duct liners, and duct splitters.

13 Claims, 9 Drawing Figures

SOUND ABSORBING PANEL

BACKGROUND OF THE INVENTION

Although industrial noise pullution has existed for many years, it has become more acute through the use of higher speed machinery to increase production output. Also, modern jet engines — as is well known — produce a higher perceived noise level than the reciprocating internal combustion engines which they replaced. Recent regulations concerning noise pollution under the Walsh-Healy Public Contracts Act have further accelerated interest in noise abatement.

One of the commonly used types of air-borne sound absorption panel, of the prior art, comprises a sound permeable facing sheet, an interposed honeycomb core, and an impermeable backing sheet. Such devices are generally called "laminar absorbers." One such absorber is disclosed in U.S. Pat. No. 3,166,149. Although such panels are simple, strong, and lightweight, they have the disadvantage of being able to absorb sound only at certain discrete frequencies. Between these discrete absorption bands the absorption falls to a very low value.

To overcome the above-noted disadvantage, multiple-layer sandwich structures have been used. A broader sound absorption characteristic may be obtained by use of more than one layer of permeable sheets and honeycomb core, and a single impermeable backing sheet. Examples of prior devices of this general type are shown in U.S. Pat. Nos. 3,439,774; 3,640,357, and 3,670,843. Such construction, however, is bulky, heavy, and expensive.

SUMMARY OF THE INVENTION

The sound absorption characteristics of the present invention are fully equivalent to those of a double-layer construction of the type discussed above in connection with the prior art, but only a single layer of permeable facing and a single layer of honeycomb core (with its impermeable backing) are used, provided only that the core material is properly configured. Thus, it is as strong and lightweight as the widely used conventional single permeable layer construction, and is essentially as low in cost, but provides greatly improved (viz, broadband) sound absorption.

The single layer of honeycomb core utilized in the present invention is configured so that adjacent cell subcompartments within each honeycomb cell have different resonant frequencies. The subcompartments are acoustically in parallel, and the parallel system exhibits a net acoustic impedance corresponding to the parallel combination of the two individual impedances. That is, the acoustical impedances of the pair of subcompartments are in parallel and are selected such that the absorption peak of one occurs at a frequency corresponding to the absorption valley of the other. As will be disclosed hereinafter, many geometries are possible.

It is therefore an object of the present invention to provide a novel and improved laminar sound absorber.

Another object of the invention is to provide a novel and improved sound absorbing panel suitable for use under extreme environmental conditions, and which exhibits broad-band acoustical absorption comparable to multi-layer cellular structures.

Yet another object of the invention is to provide a novel and improved sound absorption panel which is simple and economical to fabricate and which functions over a relatively wide range of absorption frequencies.

Still another object of the invention is to provide a novel and improved resonant absorber having a much wider useful frequency absorption band than the simplest type of absorber honeycomb panel, for which it may be sutstituted.

DESCRIPTION OF THE PREFERRED EMBODIMENT

To facilitate an understanding of the operation of the invention, it is desirable to first review the manner in which a conventional single-layer, laminar-type, sound absorber panel operates.

Assume a resistive facing sheet of acoustic resistance $R/\rho c$ is placed in front of a honeycomb cell which is terminated at depth $L$ by an impermeable backing sheet. Then it is well known that the acoustic impedance $Z/\rho c$ at the permeable surface is:

$$Z/\rho c = (R/\rho c) - j \cot K L = R/\rho c + j (X/\rho c)$$

where $K$ is the wave number $K = 2 \pi f/c$
$f =$ frequency
$c =$ velocity of sound
$\rho =$ density of medium (gas)

As frequency is increased, the cotangent term (reactance) cyclically passes from $-\infty$ to $0$ to $+\infty$. At each zero value of the reactance, a resonance occurs and sound absorption is large:

$$\alpha = \frac{4R'}{(R'+1)^2 + \bar{X}'^2} \qquad R' = \frac{R}{\rho o}$$

$$\bar{X}' = \frac{\bar{X}}{\rho o}$$

where: $\alpha$ is sound absorption coefficient.

For large values of reactance, the absorption is small and vanishes at $X = \pm \infty$. Stated in another way, the air-filled cavity behind the permeable facing becomes resonant at each frequency for which its depth $L$ equals an odd multiple of one-quarter wavelength, and absorption is large at these frequencies. However, at each frequency for which the air space depth $L$ is an even number of quarter wavelengths, an anti-resonance occurs and at these frequencies no sound is absorbed.

Figure 1:
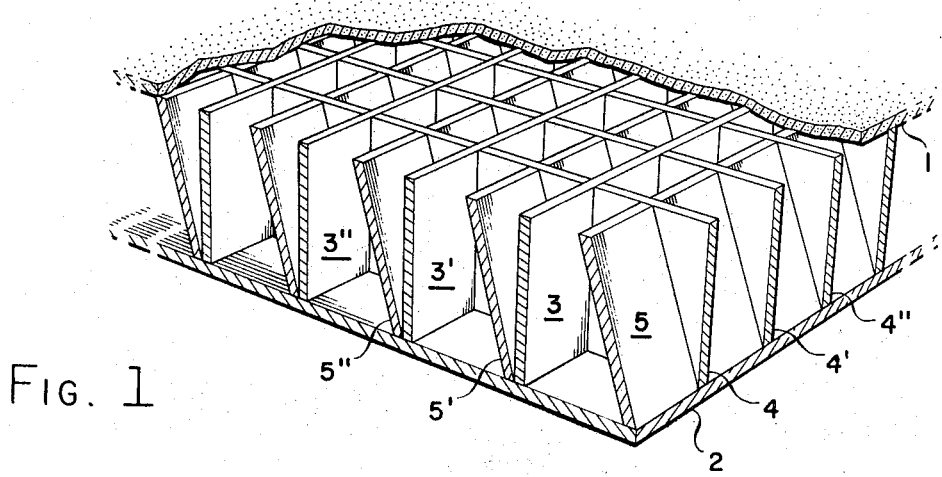
FIG. 1 is a fragmentary perspective view, partially broken away, illustrating a sound absorber panel constructed in accordance with a first embodiment of the invention.

Referring to FIG. 1 there is shown a fragmentary perspective view of a first embodiment of a sound absorbing panel constructed in accordance with the invention. The upper surface of the panel comprises a permeable facing sheet 1 which is relatively sound transparent. Facing sheet 1 may be fabricated from metal, plastic, ceramic or other suitable material and is supported by, and spaced apart from, impermeable backing sheet 2 by an interposed cellular structure. The backing sheet 2, likewise may be fabricated from metal, plastic, etc. The primary cellular structure of the apparatus of FIG. 1 is formed by a plurality of parallel wall members such as 3, 3', 3'', etc., and orthogonal wall members 4, 4', 4'', etc. In the interest of clarity, the outermost vertical side wall members of the panel have been omitted in FIG. 1 so as to expose the interior construction. The wall structures (e.g., 3 and 4) define a rectangular cell. As used hereinafter, the term "cell" refers to the parallel combination of two contiguous subcells or compartments of differing volumes or shape such as to result in differing resonant frequencies. It should be further understood that while rectangular cells have been disclosed in the embodiment of FIG. 1, cells having triangular, hexagonal, or other cross-sectional shapes may be employed. Each rectangular cell is divided into two compartments by means of an interposed partition such as partition 5, 5', 5'', etc. The geometry or configuration of the divider partition (e.g., 5) is such that each primary rectangular cell is divided into two subcells or compartments of dissimilar size, shape, or both.

While in the usual case the subcells or compartments are configured to have differing resonant frequencies, by reason of their having dissimilar volumes, it is, of course, possible to employ convergent and divergent horn elements having equal volumes, or depths, but having different resonant frequencies due only to the shape difference. Also, sound entrance areas might be unequal. This is not usually preferred because differing facing resistances would then be preferable and this would be inconvenient. Various embodiments incorporating certain of these alternatives will be described in a subsequent part of this specification. However, to facilitate the exposition of the invention, the initially described embodiment will be considered as having compartments of dissimilar volumes.

As will be readily appreciated, the volume of one compartment (e.g., the compartment bounded by elements 2, 3, 4 and 5') is considerably less than the volume of the adjacent compartment (e.g., the compartment bounded by 2, 4 and 3'); hence, the impedances (and therefore the resonant frequencies) of adjacent cell compartments will be dissimilar. Also, in the arrangement shown in FIG. 1 the smaller compartment has a convergent shape such that the cross-sectional area diminishes in a direction away from the facing sheet 1 towards the backing sheet 2. Conversely, the cross-sectional area of the adjacent compartment increases in a direction proceeding from the facing sheet 1 towards the backing sheet 2. Furthermore, the separate resonant frequencies of the pair of compartments are no longer simply proportional to integers but are spectrally spaced in some more complicated way.

It has been found that if the compartmented air space has a convergent shape then the first resonant frequency increases, and if the shape of the compartmented air space is divergent then the frequencies of the first resonance and subsequent resonances are decreased. Thus, although the depth of the air space for both compartments is the same ($L$), a compartment may be tuned either to a higher or lower frequency by means of a different or divergent shape.

If a convergent cell and a divergent cell are adjacent to each other, they are said to be in parallel, or more precisely, their acoustical impedances are in parallel. The parallel system exhibits a net acoustic impedance which may be calculated as the parallel combination of the two individual impedances:

$$Z = Z_1 Z_2 / Z_1 + Z_2$$

Another way of considering the relationship of the adjacent compartments is that their admittances are summed. As will be understood by those versed in the art, classical means exist for computing the acoustical impedances of structures of various geometries. Once these impedances are known, the sum of their reciprocals can be arrived at in a manner analogous to that for parallel electrical networks.

The net result is a sandwich panel that is much more broadly tuned and does not exhibit the fallouts (viz, dips) in absorption which characterize the simple panel. The distributed impedance of the parallel compartments comprising the cell is such that the peaks in the absorption of one matches the dips in absorption of the other. The acoustical behavior becomes equivalent to some double layer panels of the type shown in the aforementioned prior art U.S. Pat. Nos. 3,437,774; 3,640,357; and 3,670,843. As mentioned previously, the invention may be implemented in a variety of ways other than that shown in FIG. 1.

Figure 2:
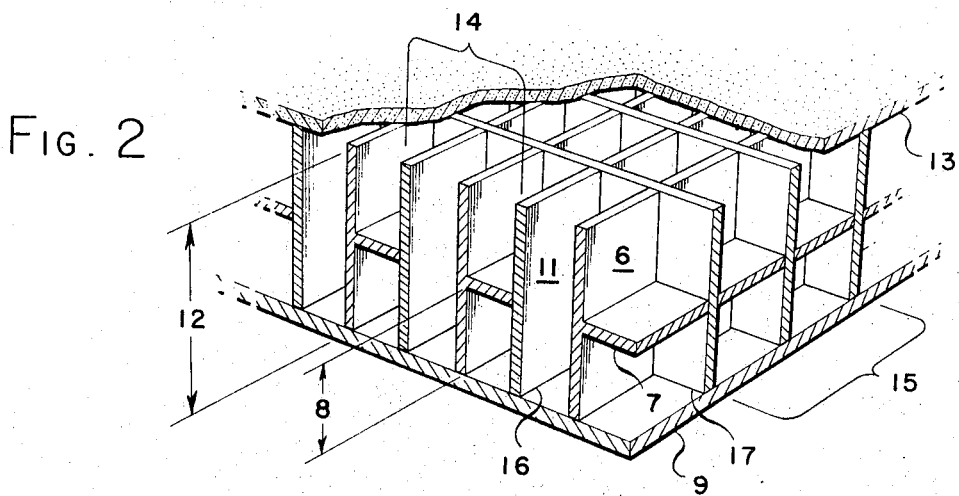
FIG. 2 is a fragmentary perspective view, partially broken away, illustrating a sound absorber panel constructed in accordance with a second embodiment of the invention.

There is shown in FIG. 2 an alternate embodiment wherein adjacent compartments within each primary cell have uniform cross-sectional areas but have dissimilar depths. For example, compartment 6 is terminated by partition 7 at a distance 8 from backing sheet 9. Compartment 11 has a depth 12 equal to the distance between permeable facing sheet 13 and impermeable backing sheet 9. The cell comprising compartments 6 and 11 is typical of adjacent cells 14 and 15, all of which are replicated in orthogonal directions with respect to the first-described cell.

A disadvantage of the construction of FIG. 2 is that a void between partitions 7 and backing sheet 9 and bounded by perpendicular wall members 16 and 17 is wasted space inasmuch as it is non-functional. This shortcoming may be overcome by the alternative constructions shown in FIGS. 3 and 4 wherein the space otherwise lost is recovered in the first instance by making use of both faces of the panel, and in the second instance by means of an offset chamber.

Figure 3:
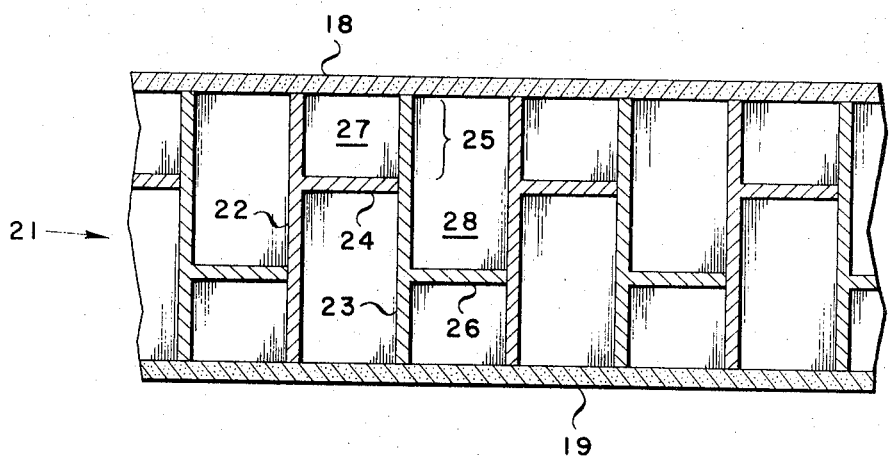
FIG. 3 is a modified version of the embodiment of FIG. 2 wherein both faces of the panel are made to absorb sound.

There is shown in FIG. 3, a panel constructed in accordance with the invention which is particularly applicable as a flow duct splitter panel. As is well known to those versed in the art, it is desired that such panels be sound absorbent on both faces. This embodiment comprises first and second permeable facing sheets 18 and 19 bonded or otherwise secured to an interposed core structure 21. The core structure 21 comprises a honeycomb core or similar cellular structure in the form of a contiguous parallel array of tubular cells. A typical cell is located between wall members 22 and 23 which are normal to facing sheets 18 and 19. A first set of partitions, such as that indicated at 24, are located in every other cell comprising the array and are spaced from the confronting facing sheet 18 by a fixed distance 25. These divided cells provide a first set of shallow compartments on one side of the panel, which are exposed to the applied sound field through confronting facing 18. Also, these same partitions 24 serve as the end walls of deeper compartments exposed to the sound field on the opposite side of the panel 19. Similarly, the remaining half of the cells in the array comprising the core structure 21 are provided with like partitions (such as that indicated at 26) which divide each cell of the second set into corresponding large and small compartments. As will be readily appreciated, compartment 27 of the first array of cells and compartment 28 of the second array of cells are contiguous with respect to facing sheet 18 and comprise the necessary subset of parallel acoustical resonators to be operative at both the upper and lower portions of the frequency range of interest.

The alternating partitions 24 and 26 are preferably spaced with a depth ratio of ⅓ to ⅔, as shown in the embodiment of FIG. 3.

Figure 4:
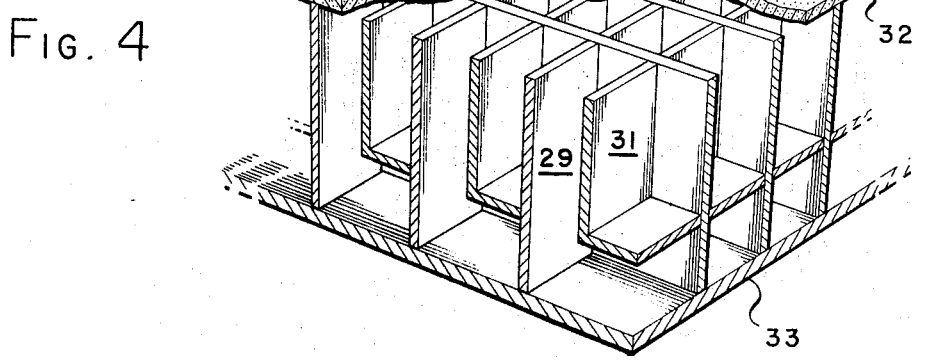
FIG. 4 is a fragmentary perspective view, partially broken away, illustrating a sound absorber panel constructed in accordance with a third embodiment of the invention.

There is shown in FIG. 4 another arrangement for avoiding unused space within the core section. In this embodiment, the compartment 29 having the lower resonant frequency has an L-shape whereas the compartment 31 having the higher frequency resonance is a simple rectangle. This arrangement of the absorber cell results in substantially all of the volume being active and the avoidance of any wasted space beneath the shallower compartment. The remaining portions of the structure are substantially the same as those appearing in the previously-described embodiments, namely, a permeable facing sheet 32 and an impermeable baking sheet 33. Also, the embodiment shown in FIG. 2 goes to work at a somewhat higher frequency than that of FIGS. 1, 3 or 4 because of the wasted volume.

Figure 5:
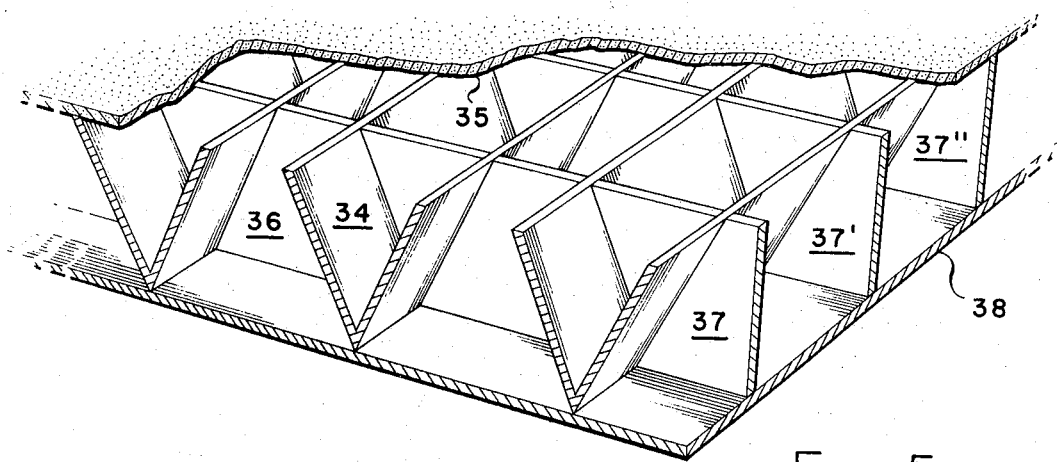
FIG. 5 is a fragmentary perspective view, partially broken away, illustrating a fourth embodiment of a sound absorber panel constructed in accordance with the invention.

Other variations in geometry may be made, so long as the underlying concept is adhered to wherein adjacent compartments, comprising each cell, have differing resonant frequencies. There is shown, for example, in FIG. 5 yet another embodiment in which the smaller compartment 34 has a converging V-shape in a direction away from the facing sheet 35, and the adjacent compartment 36, having the lower resonant frequency, has a rhomboid shape diverging in a direction away from the facing sheet 35. The cells are bounded on two sides by parallel wall members 37, 37', 37'', etc., which extend between, and are normal to, permeable facing sheet 35 and impermeable backing sheet 38. The entire assembly is secured together by spot welding, adhesive bonding, or other suitable means. In this embodiment the convergent compartments 34 may be considered as short acoustical horns. This facilitates the construction of an analytical model since the impedance at the horn mouth may be computed by means of the well-known general horn equation. Similarly, the divergent compartment 36 is treated as a short horn with an infinite impedance termination and the throat impedance is calculated from the horn equation. In practice it has been found that these calculations, performed for the geometry of the embodiment of FIG. 5 agrees with empirically-obtained measurements therefor. Half of the impinging sound enters the mouth of the converging horn shape (e.g., 34) and the other half enters the throat of a diverging horn (e.g., 36). The system acts resonantly whenever either side is near resonance. As a result, absorption remains high over a broad range of frequencies.

Figure 6:
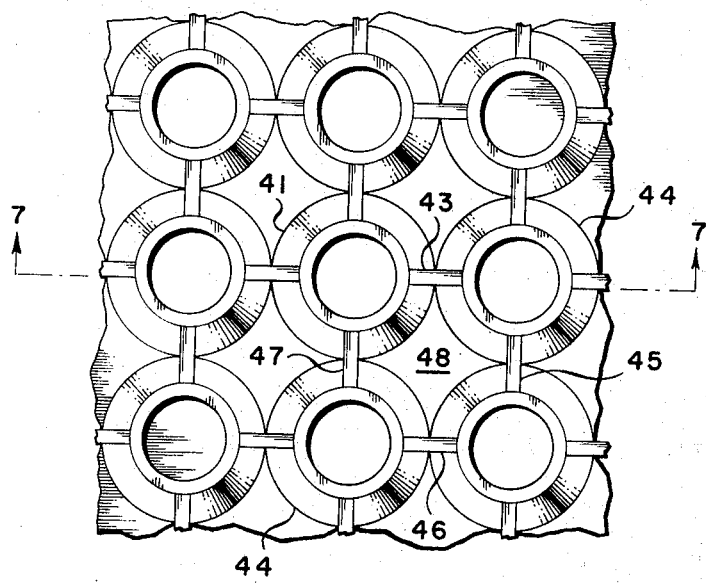
FIG. 6 is a fragmentary top plan view of a plurality of cells constructed in accordance with a fifth embodiment of the invention.
Figure 7:
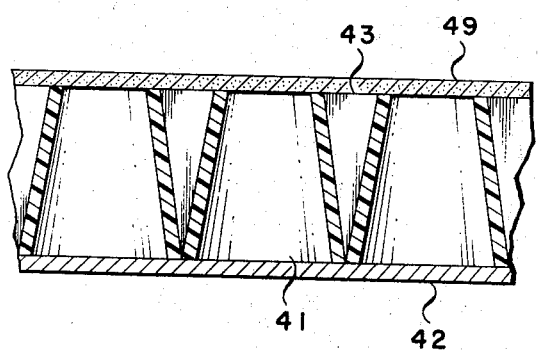
FIG. 7 is a cross-sectional elevation view of the apparatus of FIG. 6, taken along line 6—6.

FIGS. 6 and 7 illustrate a modification of the invention in which the paired compartments comprising each cell are formed by means of an array of truncated conical elements. For example, truncated cone 41 has its base secured to impermeable backing sheet 42 by adhesive bonding or other suitable means. The cone 41 may be injection molded of plastic or fabricated from any other suitable material. Cone 41 has its upper (truncated) end exposed to the source of sound to be absorbed. Wall member 43 extends perpendicularly from backing sheet 42 and interconnects cones 41 and 44. Similarly, wall members 45-47 interconnect adjacent cones so as to define a substantially square compartment 48 having a resonant frequency that is greater than the resonant frequency of a single cone (e.g., cone 41). The interior of rectangular compartment 48 comprises the low-frequency resonator of a pair of resonators and the interior of an adjacent cone — such as cone 41 — comprises the high-frequency resonator of the pair. This arrangement is free of voids or unused space. As in the case of the previously described embodiments, the compartment most nearly resonant with the applied sound field will dominate the pair of adjacent resonators and will "pull" the acoustic energy thereto. That is, one compartment of the pair will have zero reactance while the other will have gone to a theoretically infinite reactance.

The inter-cell spacing, or pattern interval between cells comprising a panel, should preferably be less than a wavelength of the highest absorption frequency of interest. This preferred spacing likewise applies to the other embodiments described above.

The embodiment shown in FIGS. 6 and 7 includes a permeable facing sheet 49 that has been omitted in FIG. 6 for clarity. Perforate or otherwise permeable facing sheets are used for protection, load-bearing, or esthetic reasons as well as to provide the preferred flow resistance, namely that which is about one-half of that used in the previously mentioned simple, single-layer, laminar absorbers. It is preferred that the permeable flow-resistive facing sheet has a value $O < R/\rho c < 2$ where $\rho$ is the density of the sound transmitting medium and $c$ is the speed of sound in the medium. This value will provide sufficient inertance to desirably modify the tuning of the resonant compartments. For optimum response it has been found that the best value of flow resistance for the facing sheet is $0.57\ \rho c$.

Figure 8:
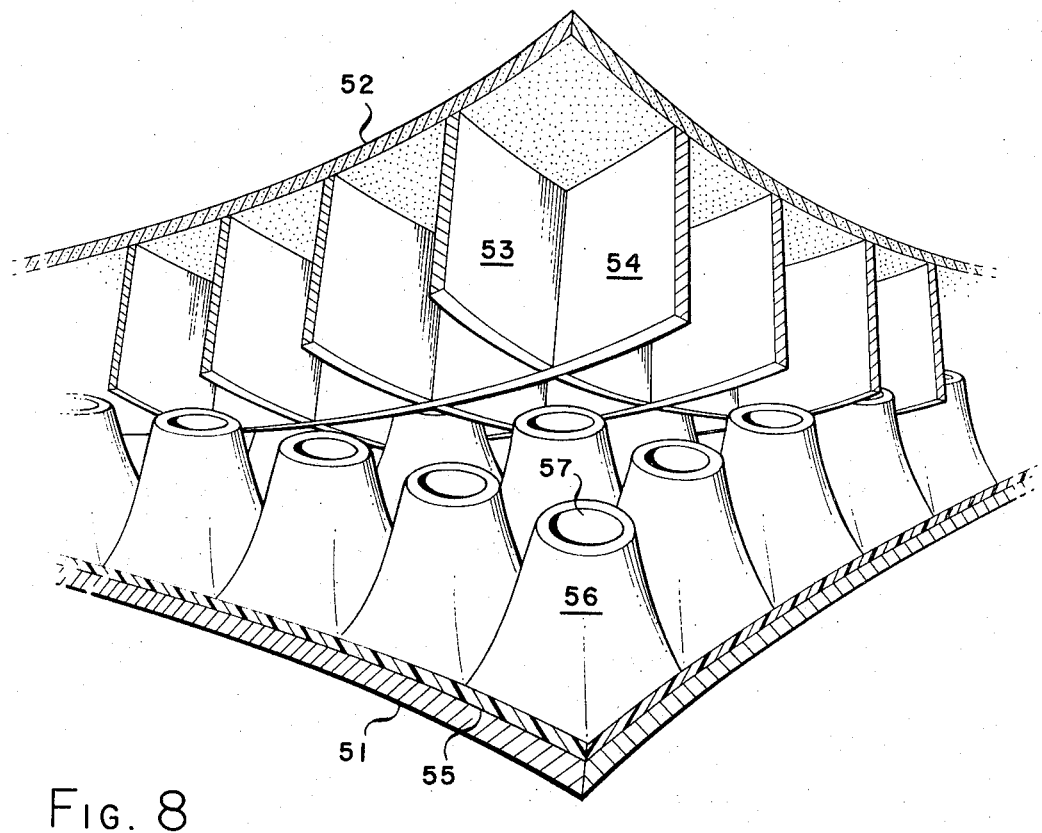
FIG. 8 is a perspective view showing the elements partially separated, illustrating the use of conical (parabolic) elements to define the compartmented array.

There is shown in FIG. 8 a geometry which is similar to that of the embodiment of FIGS. 6 and 7, in that it utilizes a combination of rectangular and horn-shaped compartments, but has the added advantage of certain manufacturing economies. This embodiment comprises an impermeable backing sheet 51 and a permeable facing sheet 52 and an interposed plurality of orthogonal walls defining an array of square cells. Typical square-cell, wall-defining, members are indicated at 53 and 54. An integral sheet 55, fabricated by vacuum forming or other similar means, provides a plurality of conical (or parabolic) horn elements which are adapted to be nested into the square-cell array. A typical horn element is indicated at 56. It should be noted that the horn element 56 is a truncated cone which makes a transition from a round shape at the upper open end 57 to a square shape at the lower end confronting impermeable backing sheet 51. The square-shaped end of each horn element is contiguous with like portions of adjacent horn elements. Each cone or horn element 56 is dimensioned to permit its entrance into a corresponding square cell of the core array. As can be readily appreciated, the conical element diverges from its open end 57 and the volume between the exterior of the cone and the interior of the square cell converges. Thus, there is provided the essential side-by-side parallel pair of acoustical resonators of dissimilar resonance frequencies, required for the intended functioning of the invention.

While there have been shown and described hereinabove a number of the embodiments of the invention each comprising a multiple array of paired resonators, it should be understood that there is no upper limiting number of cells in the array. In the simplest case a completely operative structure, made in accordance with the invention, may comprise only a single cell consisting of two compartments of dissimilar resonant frequency. This simplest, single-cell (twin compartment) case could, for example, effectively comprise the entire sound absorbing structure for an exhaust muffler or the like. Repetition of the number of bi-compartmented cells may be carried to whatever extent is appropriate for a given application.

The overall physical dimensions or geometry of the bi-compartmented cells will, of course, be dictated by the design frequencies.

Figure 9:
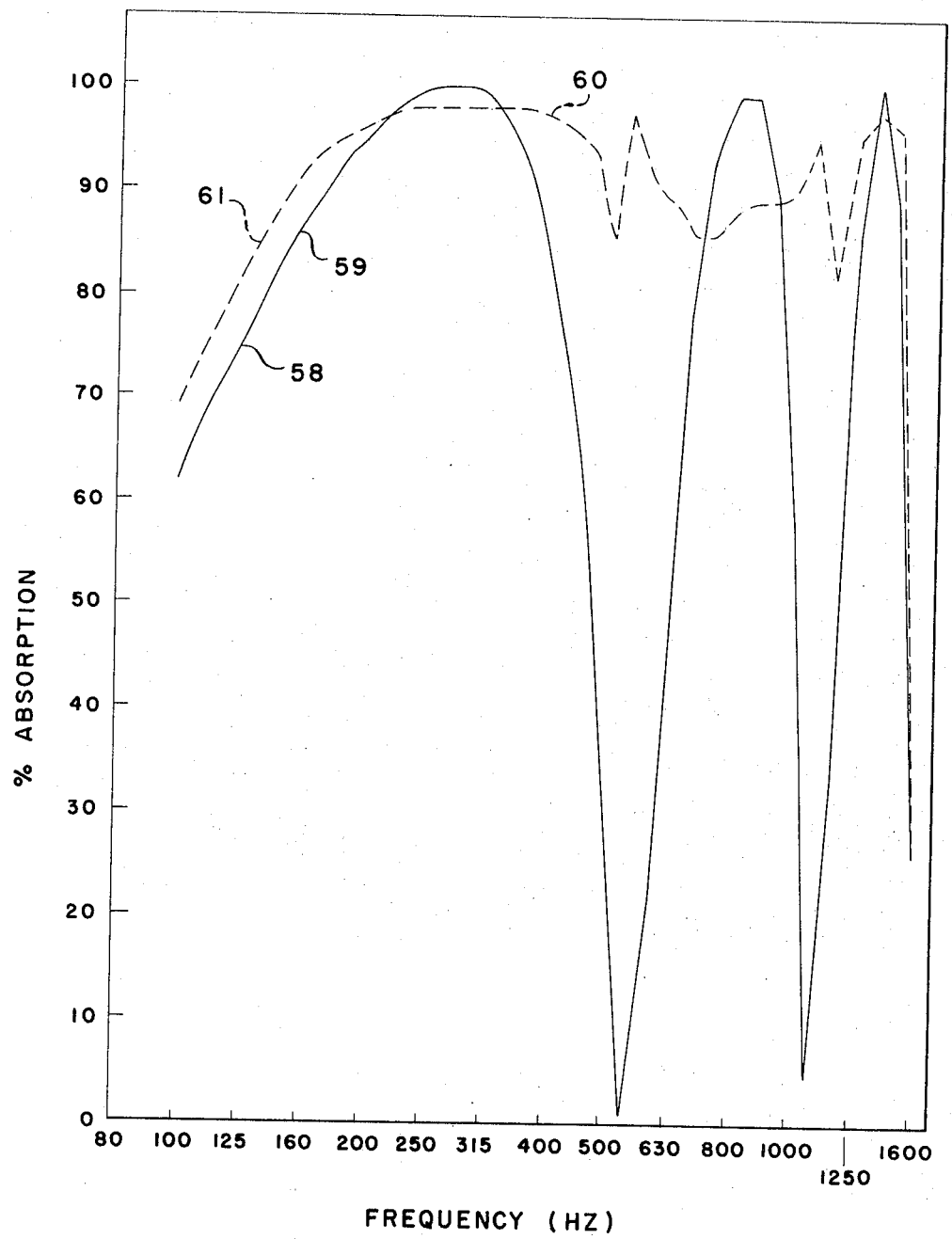
FIG. 9 is a chart graphically illustrating performance of the invention in terms of percentage of absorption versus frequency.

There is shown in FIG. 9 a comparison of the performance of the embodiment of FIG. 2 as compared with conventional single-layer honeycomb laminar absorbers of the prior art. In this instance, the simple air space comprises contiguous cells having a uniform depth of 1 foot. This is compared with the calculated performance for paired compartments of the present invention in which one set of compartments has a depth of 0.65' and the adjacent parallel compartments have a depth of 1 foot. The actual measured performance is for a construction having a depth of 0.665'for one set of compartments and a depth of 1 foot for the adjacent parallel compartments. As can be seen in curve 58, the calculated absorption of a simple air space structure (viz, laminar absorber) has a plurality of frequency bands (e.g., 550 Hz, 1,100 Hz, and 1,600 Hz) at which little or no absorption takes place. The actually measured points 59, et seq., confirm this characteristic. On the other hand, the calculated absorption of the offset type of absorber, such as that shown in FIG. 4, has a relatively uniform absorption over the frequency band from 100 Hz to well above 1,250 Hz, as is indicated by curve 60. This calculated performance is confirmed by the measured performance indicated at points 61, et seq.

From the foregoing description it will be seen that there is provided by the present invention a novel construction for laminar type sound absorbers that substantially extends the useful operating range, with respect to frequency absorption bandwidth, without an undesirable increase in physical depth.

It will be apparent to those versed in the art that various modifications, in addition to those described above, may be made to the represented embodiments of the invention.

What is claimed is:

1. A sound absorbing panel comprising:
   an array of wall defining means coplanarly arranged to provide a plurality of side-by-side hollow cells having adjacent open ends defining the sound receiving end of the array, the sound-receiving ends of adjacent cells being spaced from each other by a distance not more than one wavelength of the highest frequency to be absorbed by said panel;
   a plurality of partitions each of which is disposed within a corresponding one of said cells so as to divide said cell into adjacent resonator compartments, the physical parameters of one of said compartments being such as to result in resonance thereof when the other of said compartments is substantially at antiresonance;
   a flow resistive permeable facing sheet, having a value of $0 < R/\rho c < 2$ where $\rho$ is the density of the sound transmitting medium and $c$ is the speed of sound in the medium, covering the sound-receiving ends of said compartments; and
   an impermeable backing sheet covering like ends of said cells opposite said sound-receiving ends.

2. A sound absorbing panel as defined in claim 1 wherein one compartment in each of said cells includes a discontinuity in its cross-sectional area for providing the difference in resonant frequency as compared with that of the other compartment in the same cell.

3. A sound absorbing panel as defined in claim 1 wherein said adjacent resonator compartments have dissimilar entrance areas.

4. A sound absorbing panel as defined in claim 1 wherein said adjacent compartments are contiguous.

5. A sound absorbing panel as defined in claim 1 wherein the parallel combination of acoustical impedances of said adjacent compartments, and of their series flow-resistive facing sheets, remains finite over a predetermined frequency range.

6. A sound absorbing panel as defined in claim 1 wherein the reactive component of the acoustical impedances of the parallel combination of said adjacent compartments remains substantially at zero over a predetermined frequency range.

7. A sound absorbing panel as defined in claim 1 wherein the reactive component of the acoustical impedance of one of said adjacent compartments is opposite in sign with respect to the reactive component of the impedance of the other of said compartments, over a predetermined frequency range 8. A sound absorbing panel as defined in claim 1 wherein said wall defining means comprises:
   a plurality of orthogonally disposed parallel wall members defining a plurality of rectangular cells.

9. A sound absorbing panel as defined in claim 8 including:

a plurality of partition means one each of which is disposed parallel to and spaced apart from said backing sheet within every other one of said rectangular cells.

10. A sound absorbing panel as defined in claim 1 wherein one compartment in each of said cells has a convergent shape such that the cross-sectional area thereof diminishes in a direction away from said facing sheet.

11. A sound absorbing panel as defined in claim 10 wherein the other compartment in each of said cells has a divergent shape such that the cross-sectional area thereof increases in a direction away from said facing sheet.

12. A sound absorbing panel as defined in claim 1 wherein one compartment in each of said cells has an L-shape, with the maximum dimension thereof being normal to said facing and backing sheets.

13. A sound absorbing panel as defined in claim 1 wherein one compartment in each of said cells comprises a truncated cone.

* * * * *